United States Patent
Filippov et al.

(10) Patent No.: US 11,821,305 B2
(45) Date of Patent: Nov. 21, 2023

(54) APPLICATION OF THE ENSEMBLE KALMAN FILTER TO DYNAMIC HISTORY MATCHING IN WELLBORE PRODUCTION

(71) Applicant: Landmark Graphics Corporation, Houston, TX (US)

(72) Inventors: Andrey Filippov, Houston, TX (US); Yevgeniy Zagayevskiy, Houston, TX (US); Vitaly Khoriakov, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 447 days.

(21) Appl. No.: 16/774,883

(22) Filed: Jan. 28, 2020

(65) Prior Publication Data

US 2020/0182051 A1   Jun. 11, 2020

Related U.S. Application Data

(63) Continuation of application No. PCT/US2018/064050, filed on Dec. 5, 2018.

(51) Int. Cl.
| | |
|---|---|
| *G06F 11/30* | (2006.01) |
| *E21B 47/135* | (2012.01) |
| *G01F 1/74* | (2006.01) |
| *G01V 3/18* | (2006.01) |
| *G02B 6/44* | (2006.01) |

(52) U.S. Cl.
CPC .............. *E21B 47/135* (2020.05); *G01F 1/74* (2013.01); *G01V 3/18* (2013.01); *G02B 6/4471* (2013.01)

(58) Field of Classification Search
CPC .................................................. E21B 47/135
See application file for complete search history.

(56) References Cited

U.S. PATENT DOCUMENTS

| | | | |
|---|---|---|---|
| 9,031,822 B2 | 5/2015 | Sarma et al. | |
| 2007/0118346 A1 | 5/2007 | Wen et al. | |

(Continued)

FOREIGN PATENT DOCUMENTS

WO   2017078700 A1   5/2017

OTHER PUBLICATIONS

Ammiwala, Huzefa, "Stochastic Nodal Analysis: EnKF and PF applied to petroleum product systems", TU Delft Civil Engineering and Geosciences; TU Delft GeoScience and Engineering, https://repository.tudelft.nl/islandora/object/uuid: 7441b61a-50ce-4b2b-90a5-eb5ff8fdeba4?collection=education, Aug. 31, 2017 (Year: 2017).*

(Continued)

*Primary Examiner* — Phuong Huynh
(74) *Attorney, Agent, or Firm* — Michael Jenney; C. Tumey Law Group, PLLC

(57) ABSTRACT

A method for identifying a flow parameter in a wellbore may comprise identifying a state vector at a moment t, performing a flow simulation using a flow model, predicting the state vector and a covariance matrix at the moment t, updating the state vector with an EnKF algorithm, correcting the state vector at the moment t, and updating the flow simulation model. A system for identifying a flow parameter in a wellbore may comprise a distributed acoustic system into a wellbore and an information handling system. The distributed acoustic system may comprise a fiber optic cable and at least one measurement device.

18 Claims, 2 Drawing Sheets

(56) References Cited

U.S. PATENT DOCUMENTS

| | | |
|---|---|---|
| 2012/0215511 A1 | 8/2012 | Sarma et al. |
| 2014/0216151 A1* | 8/2014 | Godfrey .................. G01F 1/704 |
| | | 73/152.32 |
| 2015/0378053 A1* | 12/2015 | Abadpour ............ G01V 99/005 |
| | | 702/2 |
| 2017/0067323 A1 | 3/2017 | Katterbauer et al. |
| 2018/0225396 A1* | 8/2018 | Lee ......................... E21B 43/00 |

OTHER PUBLICATIONS

ISRWO International Search Report and Written Opinion for PCT/US2018/064050 dated Sep. 6, 2019.

Aanonsen et al., The ensemble Kalman Filter in Reservoir Engineering—a review, SPE 117274. 2009.

Saad, G., & Azizi, F. (2015). The use of the ensemble Kalman filter for production management in the presence of impermeable obstructions. Journal of Petroleum Exploration and Production Technology, 6(3), 519-531.

Zagayevskiy, Y., & Deutsch, C. V. (2015). Assimilation of Time-Lapse Temperature Observations and 4D-Seismic Data With the EnKF in SAGD Petroleum Reservoirs. Journal of Canadian Petroleum Technology, 54(03), 164-182.

Great Britain Office Action Application No. GB2106123.9 dated Apr. 29, 2022.

Canadian Office Action for Application No. 3115202 dated Nov. 2, 2022.

M. H. Ammiwala, Stochastic Nodal Analysis EnKF and PF applied to petroleum production systems, Masters Thesis at Delft University of Technology, Aug. 31, 2017.

* cited by examiner

APPLICATION OF THE ENSEMBLE KALMAN FILTER TO DYNAMIC HISTORY MATCHING IN WELLBORE PRODUCTION

BACKGROUND

Bore holes drilled into subterranean formations may enable recovery of desirable fluids (e.g., hydrocarbons) using a number of different techniques. After the conclusion of drilling operations, a distributed acoustic system (DAS) and/or the like may be disposed within the borehole and measurements may be taken for production operations. Measurements allow for real time evaluation of the flow parameters in the wellbore such as flow rates, pressure and temperature. Examples of widely used measurement tools include the Production Logging Tool (PLT) measurements and distributed fiber-optic acoustic/temperature sensors.

Obtaining vast amount of information from the DAS system may be successfully used for identifying detailed information about the near-wellbore formation, including distribution of porosity, absolute and relative permeability, as well as the conditions of the flow. The Ensemble Kalman Filter (EnKF) is one of the most efficient mathematical methods for calibration of detailed numerical well models with measured data, yielding improved model parameters at each measurement step and making the production forecast more accurate. However, these algorithms are used for dynamic history matching of parameters in a reservoir model. Application of EnKF algorithms to determine a dynamic history matching for wellbore production may be beneficial.

BRIEF DESCRIPTION OF THE DRAWINGS

These drawings illustrate certain aspects of some examples of the present invention, and should not be used to limit or define the invention.

DETAILED DESCRIPTION

Provided are systems and methods for dynamic history matching of wellbore production models based on using the difference between model-predicted values and measured data for updating the wellbore model parameters. This may allow for more accurate information about physical properties of the near-wellbore area of an underground formation.

Figure 1:
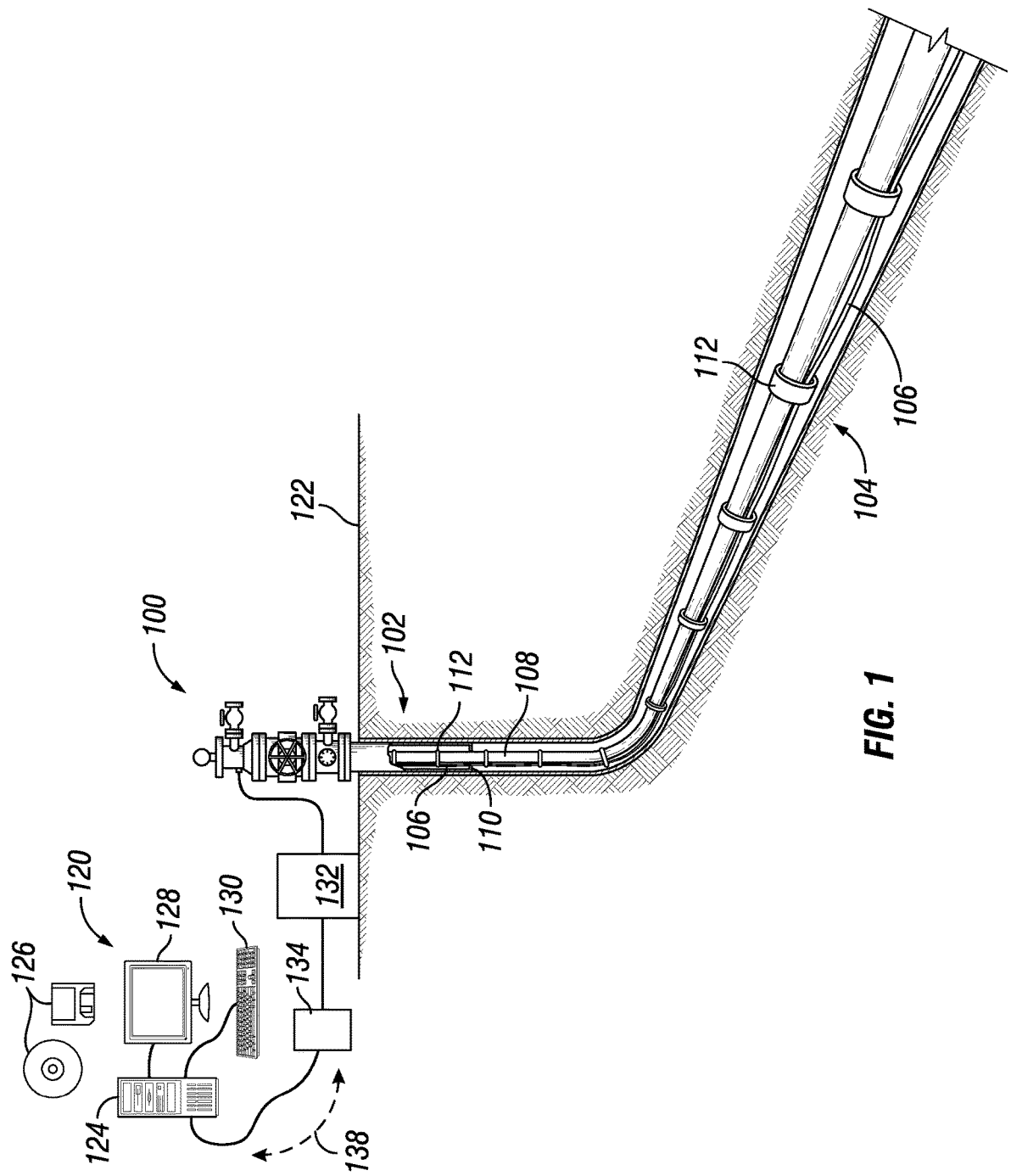
FIG. 1 illustrates an example of a distributed acoustic sensing system operating on a well system.

FIG. 1 generally illustrates an example of a well system 100 that may be used in a completed well 102, which may include a distributed acoustic sensing ("DAS") system 104. In examples, completed well 102 may be a steam assisted gravity drainage (SAGD) reservoir, which may be monitored by DAS system 104. It should be noted that well system 100 may be one example of a wide variety of well systems in which the principles of this disclosure may be utilized. Accordingly, it should be understood that the principles of this disclosure may not be limited to any of the details of the depicted well system 100, or the various components thereof, depicted in the drawings or otherwise described herein. For example, it is not necessary in keeping with the principles of this disclosure for completed well system 100 to include a generally vertical wellbore section and/or a generally horizontal wellbore section. Moreover, it is not necessary for formation fluids to be only produced from subterranean formation 118 since, in other examples, fluids may be injected into subterranean formation 118, or fluids may be both injected into and produced from subterranean formation 118, without departing from the scope of the disclosure. Additionally, completed well 102 may be a producing well, an injection well, a recovery well, and/or an uncompleted well. Further, while FIG. 1 generally depicts land-based system, those skilled in the art will readily recognize that the principles described herein are equally applicable to a subsea operation, without departing from the scope of the disclosure.

Figure 2:
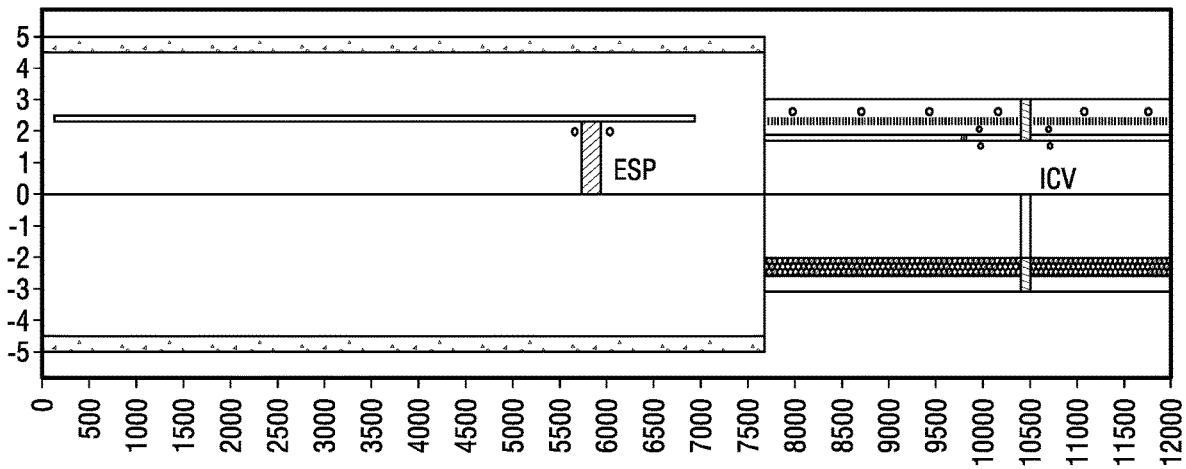
FIG. 2 illustrates a cross-section schematic with common and potential sensor locations.

In FIG. 1, DAS system 104 may be disposed along production tubing 108 and further within casing 110. DAS system 104 may include a fiber optic cable 106. Fiber optic cable 106 may be single mode, multi-mode, or a plurality thereof. In examples, fiber optic cable 106 may be permanently installed and/or temporarily installed in completed well 102. Without limitation, DAS system 104 may operate and function to measure and produce a time-lapse vertical seismic profile ("VSP"). Fiber optic cable 106 may be communicatively coupled to at least one measurement device 112 on production tubing 108. Measurement devices 112 may be geophones, hydrophones, MEMS accelerometers, optical fiber, transducers, and/or the like. In examples, measurement devices 112 may be utilized to measure a data set, which may include temperature, pressure, electromagnetic fields, refraction, borehole properties, fluid properties, and/or the like. FIG. 2 illustrates a cross-section schematic with common and potential locations for measurement devices 112. Without limitation, measurement devices 112 may communicate wirelessly and may not be connected to fiber optic cable 106. In examples, measurement devices 112 may clamp to production tubing 108. However, fiber optic cable 106 may be clamped to production tubing through any suitable means. It should be noted that fiber optic cable 106 may also be cemented in place within casing 110 and/or attached to casing 110 by any suitable means. Additionally, fiber optic cable 106 may be attached to coil tubing and/or a conveyance. Without limitation, fiber optic cable 106 may be attached to coil tubing and/or attached or combined with another conveyance (e.g. wireline or slickline) by any suitable means. Coil tubing and the conveyance may be disposed production tubing 108 and/or completed well 102 by any suitable means.

DAS system 104 may function and operate to measure in real time flow parameters, such as flow rates, pressure, and/or temperature. Measurements may be recorded by DAS system 104 on information handling system 120. It should be noted that DAS system 104 may further utilize a sensor and/or measurement device. Additionally, measurement devices 112 may record seismic waves 114 and/or reflected seismic waves 116 and may transmit information through fiber optic cable 106 to information handling system 120. Measuring dynamic strain in fiber optic cable 106 may include a strain measurement, fiber curvature measurement, fiber temperature measurement, and/or energy of backscattered light measurement. A strain measurement may be performed by an operation of Brillouin scattering (via Brillouin Optical Time-Domain Reflectometry, BOTDR, or Brillouin Optical Time-Domain Analysis, BOTDA), or Rayleigh scattering utilizing Optical Frequency Domain Reflectometry (OFDR). A Fiber curvature measurement may be performed using Polarization Optical Time Domain Reflectometry (P-OTDR) or Polarization-Optical Frequency Domain Reflectometry (P-OFDR). A Fiber temperature measurement may be performed utilizing Raman DTS. An energy of backscattered light of DAS measurement may be performed utilizing an automatic thresholding scheme, the fiber end is set to the DAS channel for which the backscattered light energy flat lines. The purpose of all these measurements may be to compute the structure and properties of subterranean formation 118 at different times. This may allow an operator to perform reservoir monitoring.

Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit 124 (CPU) or hardware or software control logic, ROM, and/or other types of nonvolatile memory. Additional components of the information handling system 120 may include one or more disk drives 126, output devices 128, such as a video display, and one or more network ports for communication with external devices as well as an input device 130 (e.g., keyboard, mouse, etc.). Information handling system 120 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling system 120 may be connected to DAS system which may further include a single mode-multimode ("SM-MM") converter 132 and a Fiber Vertical Seismic Profile ("VSP") interrogator 134. SM-MM converter 132 may be used to convert between a single mode and a multimode for fiber communication. FiberVSP interrogator 134 may be used to emit light pulses into the fiber optic cable 106 and translate the backscattered light pulses to digital information, which may be read by information handling system 120. In examples, information handling system 120 may communicate with DAS system 104 and act as a data processing system that analyzes measured and/or collected information. This processing may occur at surface 122 in real-time. Alternatively, the processing may occur at surface 122 and/or at another location.

It should be noted that information handling system 120 may be connected to DAS system 104. Without limitation, information handling system 120 may be a hard connection or a wireless connection 138 to DAS system 104. Information handling system 120 may record and/or process measurements from DAS system 104 individually and/or at the same time.

Information collected by DAS system 104 may be utilized to identify details regarding wellbore properties such as porosity, absolute and relative permeability, as well as flow rates, pressure, and/or temperature. In examples, data assimilation may be used for dynamic history matching of wellbore production models describing multi-zone production or fracture-stimulated wellbore models. Data assimilation is defined as updating model parameters based at least in part on measured data. Without limitation, an EnKF algorithm may be utilized for dynamic history matching. Equation 1, shown below, describes a forecast step and Equation 2, shown below, describes an update step. Equation 3 is a Kalman gain and Equation 4 is a covariance matrix.

$$X_t^f = M(X_{t-1}^u) + \omega_M \tag{1}$$

$$X_t^u = X_t^f + G_t \cdot (D_t - H_t \cdot X_t^f) \tag{2}$$

$$\text{Kalman Gain}: G_t = C_t \cdot H_t^T \cdot (H_t \cdot C_t \cdot H_t^T + \varepsilon)^{-1} \tag{3}$$

$$\text{Covariance Matrix}: \|C_t\|_{i,j} = \frac{\sum_{k=1}^{N_e}(x_{i,k} - \bar{x}_i)(x_{j,k} - \bar{x}_j)}{N_e - 1} \tag{4}$$

It should be noted that $X_t^f$ is predicted augmented state vector of the system, t is time, $G_t$ is the Kalman gain matrix, $\omega$ is randomly distributed model error, $\varepsilon$ is the covariance matrix of data measurement errors, $C_t$ is the model covariance matrix, $H_t$ is the observation matrix, $D_t$ is the matrix of measured data, M is the flow model function, $X_t^u$ is the updated state vector, and $X_{i,k}$ and $X_{j,k}$ and the $k^{th}$ realizations of the $i^{th}$ and $j^{th}$ ensemble elements if matrix $X_t^f$. Based on condition of the system $X_{t-1}^f$ at time t−1, the mathematical model M yields prediction $X_t^f$ on the system's condition at moment t. The EnKF algorithm uses the data $D_t$ obtained at moment t to make a correction, resulting in updated state vector $X_t^u$.

Figure 3:
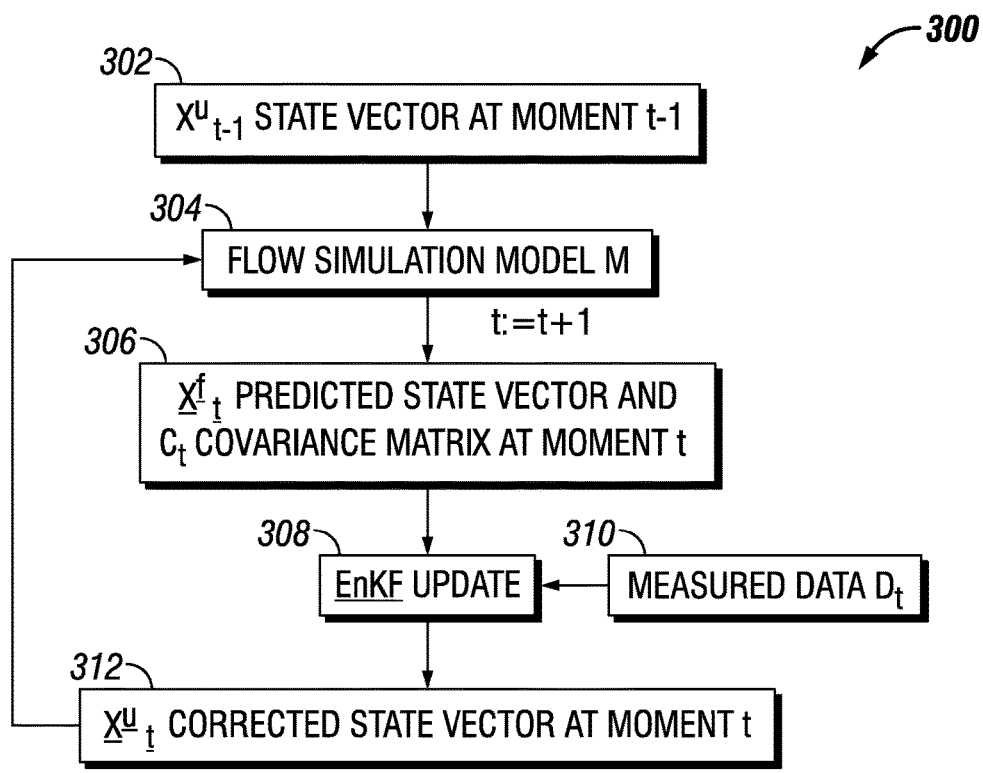
FIG. 3 illustrates a workflow for data assimilation.

FIG. 3 illustrates workflow 300 for data assimilation. As illustrated workflow 300 begins with step 302. In step 302, the variable $X_{t-1}^u$ is solved for in Equation (1) to determine a state vector at moment t−1. It should be noted that a state vector is defined as the instantaneous value of the vector convening all possible information about the state of a system at that instance. Once the state vector is determined for moment t−1, in step 304 a flow simulation is performed on information handling system 120 (e.g., referring to FIG. 1) as a software program for the following moment t. It should be noted that any suitable flow simulator for modeling flow rates in a wellbore may be used. Moving from step 304 to step 306, involves prediction of the state vector $X_t^f$ and the covariance matrix $C_t$ based on the simulation. In examples, the predicted state vector $X_t^f$ is solved for in Equation (2) with known variable and solved for variable from Equation (1), as described above. The variable $C_t$ is solved for using Equation (3) and Equation (4) with known measured variable and solved for variable from Equation (1) and Equation (2) as discussed above. Solved for variable from step 306 is used in step 308 for an EnKF update with account for information from step 310, specifically measured data $D_t$. For example, the EnKF algorithm uses the data $D_t$ obtained at moment t to make a correction, resulting in updated state vector $X_t^u$. Updated information from step 308 is used in step 312 with Equation (2) to solve for variable $X_t^u$, the variable $X_t^u$ is a corrected state vector at moment t. The corrected state vectors from step 312 feeds into step 304 as a loop for a corrected and updated state vector.

In an example, utilizing workflow 300 above, consider a well with five production zones, each characterized by absolute permeability ki, (i=1, . . . 5). At each time step t, the measured production rates from these zones are Qi, (i=1, . . . 5). Assuming that all other parameters of the system are known exactly, the state vector of the system is:

$$X_t^u = \begin{pmatrix} \|K_i\|_{i=1}^5 \\ \|Q_i\|_{i=1}^5 \end{pmatrix} \quad (5)$$

The production from the well may be predicted by a wide range of models, starting with a full scale three dimensional ("3D") model and ending with simple productivity index-based models. In this synthetic example, a dependence of the production rate from time and permeability is used it also for simulating the measurement data by adding 1% Gaussian noise.

Table 1 below shows results of a convergence of normalized zone permeabilities.

TABLE 1

| t  | 1      | 2       | 3       | 10      | 15      | "true"  |
|----|--------|---------|---------|---------|---------|---------|
| k1 | 1.2198 | 0.91065 | 0.83121 | 0.83505 | 0.83513 | 0.83818 |
| k2 | 1.2347 | 1.1708  | 0.92632 | 0.89367 | 0.89456 | 0.90337 |
| k3 | 1.5039 | 1.5674  | 1.4258  | 1.3875  | 1.3867  | 1.4007  |
| k4 | 1.2823 | 1.5343  | 1.6655  | 1.6845  | 1.6831  | 1.6711  |
| k5 | 1.4516 | 1.5021  | 1.3733  | 1.3511  | 1.3511  | 1.3502  |

Table 1 shows convergence of dynamically matched permeability values. The permeabilities converge after a few time steps. The difference between these converged values and "true" permeabilities (last column in Table 1) is due to the 1% noise level used for mimicking the measured data Dr. The methods identified above may be used when evaluating the zone permeability value in dynamic matching of models describing production from multi-zone fracture-stimulated reservoir. Updated wellbore model parameters using the systems and methods discussed above may allow an operator to alter and/or perform additional drilling operations, stimulation operations, and/or production operations. In examples, an operator may be defined as an individual, group of individuals, or an organization.

Statement 1. A method for identifying a flow parameter in a wellbore comprising: identifying a state vector at a moment t; performing a flow simulation using a flow model; predicting the state vector and a covariance matrix at the moment t; updating the state vector with an EnKF algorithm; correcting the state vector at the moment t; and updating the flow simulation model.

Statement 2. The method of statement 1, further comprising adding measured data to the EnKF algorithm.

Statement 3. The method of statements 1 or 2, wherein the EnKF algorithm comprises a forecast step of $X_t^f=M(X_{t-1}^u)+\omega_M$, wherein $X_t^f$ is predicted augmented state vector, M is a flow model function, $X_{t-1}^u$ is a state vector at moment t−1, and $\omega_M$ is a randomly distributed model error of the flow model function.

Statement 4. The method of statement 3, wherein the EnKF algorithm comprises an update step of $X_t^u=X_t^f+G_t \cdot (D_t-H_t \cdot X_t^f)$, wherein $X_t^u$ is the updated state vector, $G_t$ is a Kalman gain matrix, $D_t$ is a matrix of measured data, $H_t$ is an observation matrix, and $X_t^f$ is a predicted matrix.

Statement 5. The method of statement 1 or 2, further comprising identifying a location for at least one measurement device on a production tubing.

Statement 6. The method of statement 5, wherein the measurement device comprises a geophone, a hydrophone, an accelerometer, a transducer, or an optical fiber.

Statement 7. The method of statement 5, wherein the measurement device is used to record at least one data set.

Statement 8. The method of statement 7, wherein the data set comprises at least one data type selected from the group consisting of temperature, pressure, electromagnetic fields, refraction, borehole properties, and fluid properties.

Statement 9. The method of statements 1, 2, or 5, wherein the correcting the state vector at moment t is performed by $$X_t^u = \begin{pmatrix} \|K_i\|_{i=1}^5 \\ \|Q_i\|_{i=1}^5 \end{pmatrix},$$

wherein Ki is an absolute permeability and Qi is a measured production rate.

Statement 10. A method for identifying a flow parameter in a wellbore comprising: identifying a state vector at a moment t; performing a flow simulation using a flow model; predicting the state vector and a covariance matrix at the moment t; updating the state vector with an EnKF algorithm, wherein the EnKF algorithm comprises a forecast step of $X_t^f=M(X_{t-1}^u)+\omega_M$, wherein $X_t^f$ is predicted augmented state vector, M is a flow model function, $X_{t-1}^u$ is a state vector at moment t−1, and $\omega_M$ is a randomly distributed model error of the flow model function, and wherein the EnKF algorithm comprises an update step of $X_t^u=X_t^f+G_t \cdot (D_t-H_t \cdot X_t^f)$, wherein $X_t^u$ is the updated state vector, $G_t$ is a Kalman gain matrix, $D_t$ is a matrix of measured data, $H_t$ is an observation matrix, and $X_t^f$ is a predicted matrix; correcting the state vector at the moment t, wherein the correcting the state vector at moment t is performed by $$X_t^u = \begin{pmatrix} \|K_i\|_{i=1}^5 \\ \|Q_i\|_{i=1}^5 \end{pmatrix},$$

wherein Ki is an absolute permeability and Qi is a measured production rate; and updating the flow simulation model, wherein the flow simulation model is a three dimensional model or a productivity index-based model.

Statement 11. A system for identifying a flow parameter in a wellbore comprising: a distributed acoustic system into a wellbore, wherein the distributed acoustic system comprises: a fiber optic cable; and at least one measurement device; and an information handling system configured to: identify a state vector at moment t−1; perform a flow simulation model; predict the state vector and a covariance matrix at moment t; update the state vector with an EnKF algorithm; correct the state vector at moment t; and update the flow simulation model.

Statement 12. The system of statement 11, wherein the information handling system is further configured to add measured data to the EnKF algorithm.

Statement 13. The system of statements 11 or 12, wherein the EnKF algorithm comprises a forecast step of $X_t^f=M(X_{t-1}^u)+\omega_M$, wherein $X_t^f$ is predicted augmented state vector of the system, M is a flow model function, $X_{t-1}^u$ is a state vector at moment t−1, and $\omega_M$ is a randomly distributed model error of the flow model function.

Statement 14. The system of statement 13, wherein the EnKF algorithm comprises an update step of $X_t^u = X_t^f + G_t \cdot (D_t - H_t \cdot X_t^f)$, wherein $X_t^u$ is the updated stat vector, $G_t$ is a Kalman gain matrix, Dr is a matrix of measured data, $H_t$ is an observation matrix, and $X_t^f$ is a predicted matrix.

Statement 15. The system of statements 11 or 12, wherein the measurement device comprises a geophone, a hydrophone, an accelerometer, a transducer, or an optical fiber.

Statement 16. The system of statement 15, wherein the measurement device is operable to record at least one data set.

Statement 17. The system of statement 16, wherein the data set comprises at least one data type selected from the group consisting of temperature, pressure, electromagnetic fields, refraction, borehole properties, and fluid properties.

Statement 18. The system of statements 11, 12, or 15, wherein the correct the state vector at moment t is performed by $$X_t^u = \begin{pmatrix} \|K_i\|_{i=1}^5 \\ \|Q_i\|_{i=1}^5 \end{pmatrix},$$

wherein Ki is an absolute permeability and Qi is a measured production rate.

Statement 19. The system of statements 11, 12, 15, or 18, wherein the flow simulation model is a three dimensional model or a productivity index-based model.

Statement 20. The system of statements 11, 12, 15, 18, or 19 wherein the information handling system is further configured for dynamic history matching with the EnKF algorithm.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying a flow parameter in a wellbore comprising:

identifying a state vector at a moment t;

performing a flow simulation using a flow model;

predicting the state vector and a covariance matrix at the moment t;

adding measured data to an EnKF algorithm;

updating the state vector with the EnKF algorithm;

correcting the state vector at the moment t;

updating the flow simulation model; and predicting production from the wellbore utilizing the updated flow simulation model.

2. The method of claim 1, wherein the EnKF algorithm comprises a forecast step of $X_t^f = M(X_{t-1}^u) + \omega_M$, wherein $X_t^f$ is predicted augmented state vector, M is a flow model function, $X_{t-1}^u$ is a state vector at moment t-1, and ($\omega_M$ is a randomly distributed model error of the flow model function.

3. The method of claim 2, wherein the EnKF algorithm comprises an update step of $X_t^u = X_t^f + G_t \cdot (D_t - H_t \cdot X_t^f)$, wherein $X_t^u$ is the updated state vector, $G_t$ is a Kalman gain matrix, $D_t$ is a matrix of measured data, $H_t$ is an observation matrix, and $X_t^f$ is a predicted matrix.

4. The method of claim 1, further comprising identifying a location for at least one measurement device on a production tubing.

5. The method of claim 4, wherein the measurement device comprises a geophone, a hydrophone, an accelerometer, a transducer, or an optical fiber.

6. The method of claim 4, wherein the measurement device is used to record at least one data set.

7. The method of claim 6, wherein the data set comprises at least one data type selected from the group consisting of temperature, pressure, electromagnetic fields, refraction, borehole properties, and fluid properties.

8. The method of claim 1, wherein the correcting the state vector at moment t is performed by $$X_t^u = \begin{pmatrix} \|K_i\|_{i=1}^5 \\ \|Q_i\|_{i=1}^5 \end{pmatrix},$$

wherein Ki is an absolute permeability and Qi is a measured production rate.

9. A method for identifying a flow parameter in a wellbore comprising:
  identifying a state vector at a moment t;
  performing a flow simulation using a flow model;
  predicting the state vector and a covariance matrix at the moment t;
  updating the state vector with an EnKF algorithm, wherein the EnKF algorithm comprises a forecast step of $X_t^f = M(X_{t-1}^u) + \omega_M$, wherein $X_t^f$ is predicted augmented state vector, M is a flow model function, $X_{t-1}^u$ is a state vector at moment t-1, and $\omega_M$ is a randomly distributed model error of the flow model function, and wherein the EnKF algorithm comprises an update step of $X_t^u = X_t^f + G_t \cdot (D_t - H_t \cdot X_t^f)$, wherein $X_t^u$ is the updated state vector, $G_t$ is a Kalman gain matrix, $D_t$ is a matrix of measured data, $H_t$ is an observation matrix, and $X_t^f$ is a predicted matrix;
  correcting the state vector at the moment t, wherein the correcting the state vector at moment t is performed by $$X_t^u = \begin{pmatrix} \|K_i\|_{i=1}^5 \\ \|Q_i\|_{i=1}^5 \end{pmatrix},$$

wherein Ki is an absolute permeability and Qi is a measured production rate;
  updating the flow simulation model, wherein the flow simulation model is a three dimensional model or a productivity index-based model; and
  predicting production from the wellbore utilizing the updated flow simulation model.

10. A system for identifying a flow parameter in a wellbore comprising:
  a distributed acoustic system into a wellbore, wherein the distributed acoustic system comprises:
    a fiber optic cable; and
    at least one measurement device; and
  an information handling system for:
    identifying a state vector at moment t-1;
    performing a flow simulation model;
    predicting the state vector and a covariance matrix at moment t;
    adding measured data to an EnKF algorithm;
    updating the state vector with EnKF algorithm;
    correcting the state vector at moment t;
    updating the flow simulation model; and
    predicting production from the wellbore utilizing the updated flow simulation model.

11. The system of claim 10, wherein the EnKF algorithm comprises a forecast step of $X_t^f = M(X_{t-1}^u) + \omega_M$, wherein $X_t^f$ is predicted augmented state vector of the system, M is a flow model function, $X_{t-1}^u$ is a state vector at moment t-1, and $\omega_M$ is a randomly distributed model error of the flow model function.

12. The system of claim 11, wherein the EnKF algorithm comprises an update step of $X_t^u = X_t^f + G_t \cdot (D_t - H_t \cdot X_t^f)$, wherein $X_t^u$ is the updated stat vector, $G_t$ is a Kalman gain matrix, $D_t$ is a matrix of measured data, $H_t$ is an observation matrix, and $X_t^f$ is a predicted matrix.

13. The system of claim 10, wherein the measurement device comprises a geophone, a hydrophone, an accelerometer, a transducer, or an optical fiber.

14. The system of claim 13, wherein the measurement device is operable to record at least one data set.

15. The system of claim 14, wherein the data set comprises at least one data type selected from the group consisting of temperature, pressure, electromagnetic fields, refraction, borehole properties, and fluid properties.

16. The system of claim 10, wherein the correct the state vector at moment t is performed by $$X_t^u = \begin{pmatrix} \|K_i\|_{i=1}^5 \\ \|Q_i\|_{i=1}^5 \end{pmatrix},$$

wherein Ki is an absolute permeability and Qi is a measured production rate.

17. The system of claim 10, wherein the flow simulation model is a three dimensional model or a productivity index-based model.

18. The system of claim 10, wherein the information handling system is further performs dynamic history matching with the EnKF algorithm.

* * * * *

UNITED STATES PATENT AND TRADEMARK OFFICE
CERTIFICATE OF CORRECTION

| | |
|---|---|
| PATENT NO. | : 11,821,305 B2 |
| APPLICATION NO. | : 16/774883 |
| DATED | : November 21, 2023 |
| INVENTOR(S) | : Filippov et al. |

It is certified that error appears in the above-identified patent and that said Letters Patent is hereby corrected as shown below:

On the Title Page

Item (73) Assignee, Please change "Halliburton Energy Services, Inc." to --Landmark Graphics Corporation--

Signed and Sealed this
Tenth Day of September, 2024

Katherine Kelly Vidal
*Director of the United States Patent and Trademark Office*